United States Patent [19]

Linquist

[11] Patent Number: 4,934,122
[45] Date of Patent: Jun. 19, 1990

[54] STORAGE VAULT AND METHOD

[75] Inventor: Thomas R. Linquist, Denair, Calif.

[73] Assignee: Convault, Inc., Denair, Calif.

[21] Appl. No.: 323,104

[22] Filed: Mar. 10, 1989

Related U.S. Application Data

[63] Continuation of Ser. No. 118,918, Nov. 16, 1987, abandoned, which is a continuation-in-part of Ser. No. 936,205, Dec. 1, 1986, abandoned.

[51] Int. Cl.$^5$ ............................ E04B 1/16; B28B 1/08
[52] U.S. Cl. .......................................... 52/741; 264/31; 264/59; 264/275
[58] Field of Search ............ 220/1 B; 52/169.6, 169.7, 52/249, 268, 269, 249, 741; 264/31, 59, 271.1, 275, 279, 333

[56] References Cited

U.S. PATENT DOCUMENTS

| | | | |
|---|---|---|---|
| 2,083,491 | 3/1936 | Chaffee ................................... | 52/267 |
| 2,136,390 | 4/1937 | McHugh ................................... | 72/14 |
| 2,531,159 | 11/1950 | Rowell ................................... | 340/605 |
| 2,544,828 | 3/1951 | Dobell ................................... | 72/14 |
| 3,439,461 | 4/1969 | Chandler et al. ....................... | 52/612 |
| 3,464,175 | 9/1969 | Akita et al. ............................ | 52/249 |
| 3,545,213 | 4/1968 | Sebor et al. ............................ | 61/45 |
| 3,562,977 | 2/1971 | Alleaume ................................. | 52/249 |
| 3,822,520 | 7/1974 | Crom, Jr. ................................ | 52/224 |
| 3,995,472 | 12/1976 | Murray ................................... | 340/605 |
| 4,183,221 | 1/1980 | Yamamoto ................................ | 62/45 |
| 4,271,647 | 6/1981 | Balck, Jr. ............................... | 52/169 |
| 4,366,654 | 1/1983 | Bomhard ................................. | 52/224 |
| 4,513,550 | 4/1985 | Kotcharian ............................. | 52/249 |
| 4,552,166 | 11/1985 | Chadbourne et al. ................. | 137/15 |
| 4,607,522 | 8/1986 | Sharp ..................................... | 73/49.2 |
| 4,653,312 | 3/1987 | Sharp ..................................... | 73/49.2 |

Primary Examiner—James L. Ridgill, Jr.
Attorney, Agent, or Firm—Townsend and Townsend

[57] ABSTRACT

A method for making a storage vault includes a steel inner tank entombed within a reinforced concrete outer tank. The inner tank is covered with a thermal insulating spacer material and then wrapped with a sheet of liquid-impervious material to trap leaks from the inner tank. The spacer layer is made of a material which liquifies upon contact with the liquid stored within the inner tank. This permits the spacer layer to fill the space between the inner and outer tanks while permitting any leak to collect at a liquid collection region between the two. The leaked liquid collection region can be monitored through a leak detector tube. Since the covering of the inner tank with the spacer layer substantially fills the space between the inner and outer tanks, pouring the concrete outer tank is simplified and thermal insulation is maximized.

3 Claims, 4 Drawing Sheets

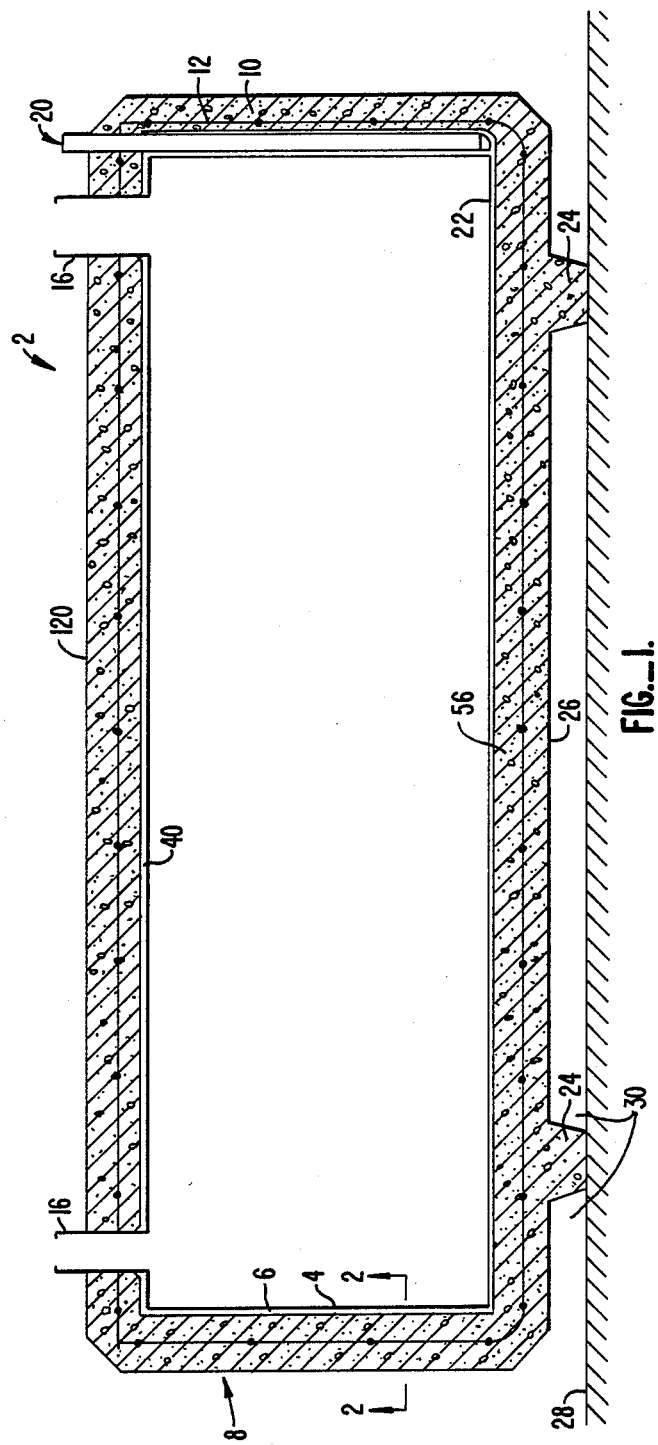
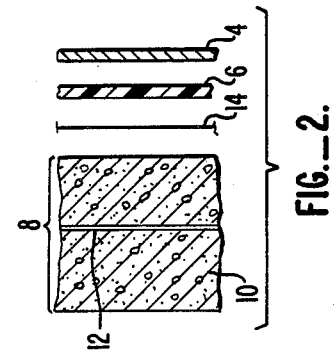
FIG._1.
FIG._2.

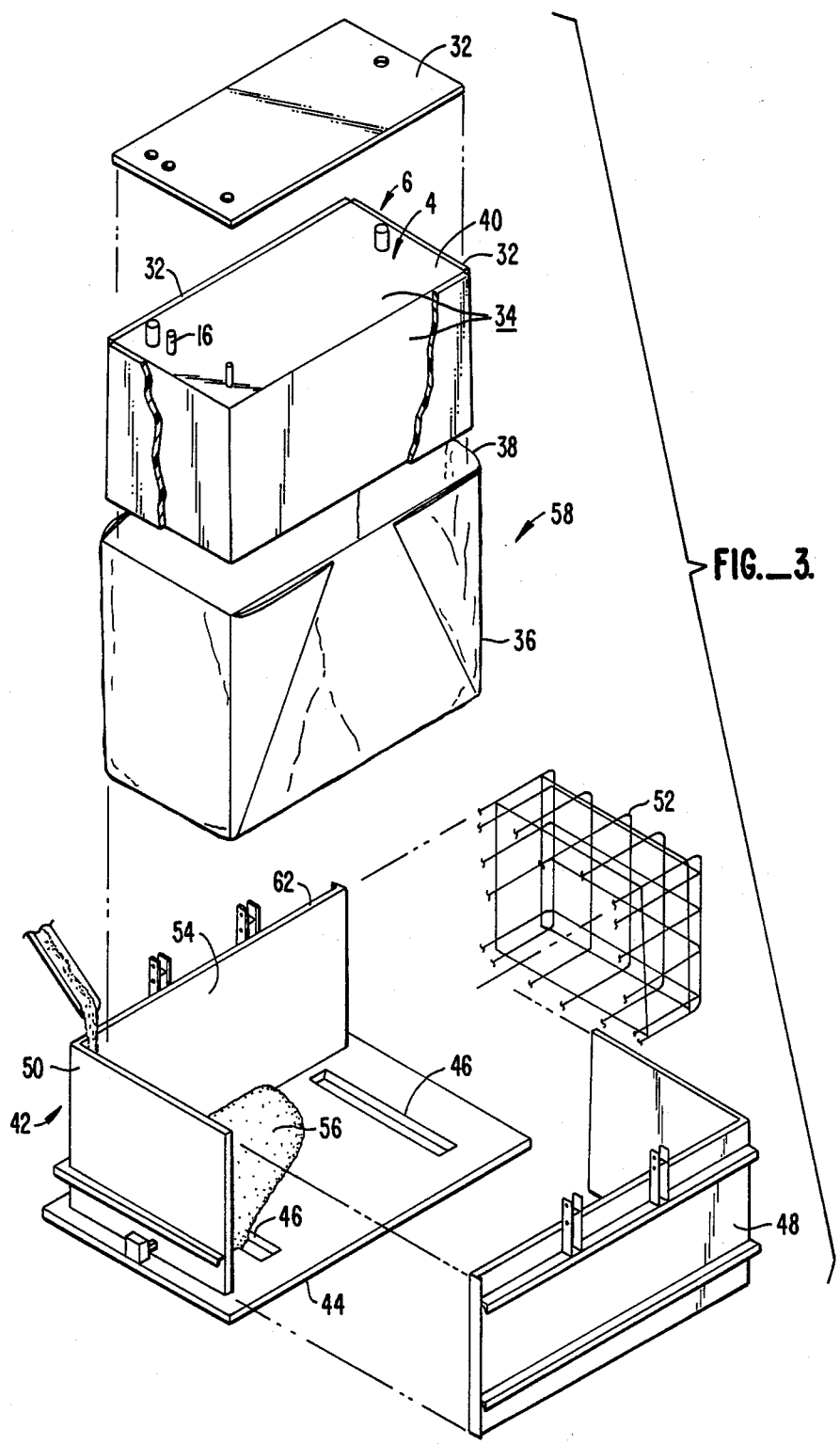
FIG._3.

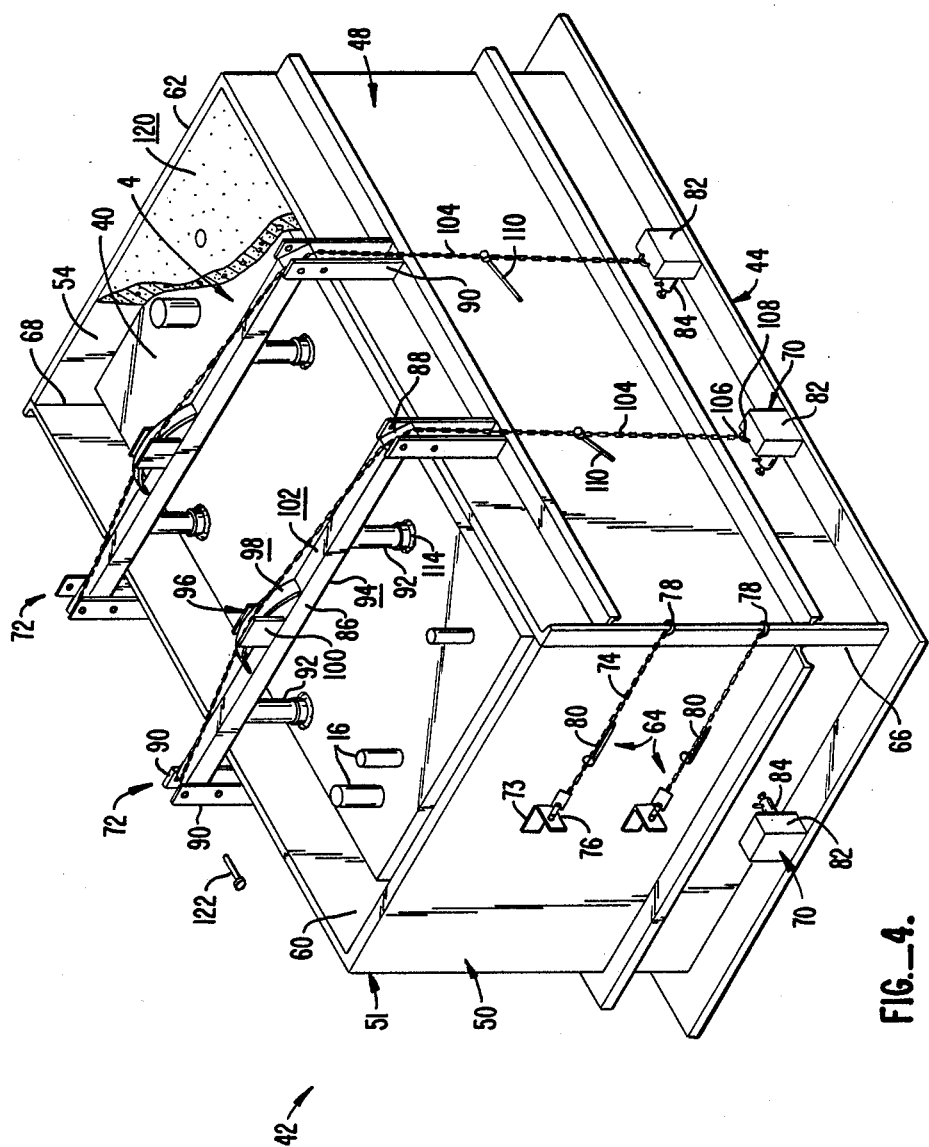
FIG._4.

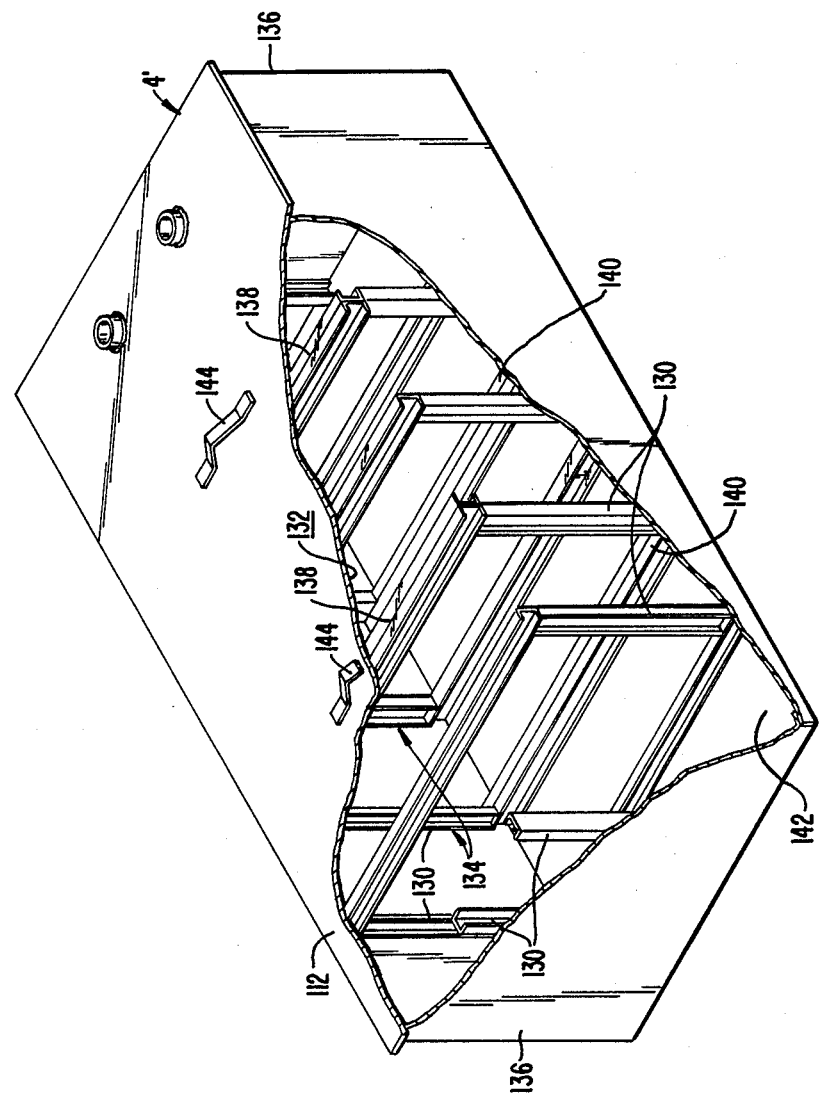
FIG._5.

STORAGE VAULT AND METHOD

This is a continuation of Ser. No. 118,918, filed Nov. 16, 1987, now abandoned.

This is a continuation-in-part of U.S. patent application Ser. No. 936,205 filed Dec. 1, 1986 and entitled Storage Vault And Method For Manufacture, the disclosure of which is incorporated by reference.

BACKGROUND OF THE INVENTION

There is a continuing interest in the safe containment of liquids. particularly gasoline and other fuels, because of the vast amount of fuel presently stored throughout the country. It has become increasingly apparent that underground storage tanks can and do leak thus causing serious short-term and long-term problems. Therefore, many localities have chosen to examine all underground tanks, mostly fuel storage tanks, to determine if the tanks are leaking. It is an expensive process to inspect the tanks and test the earth surrounding the tanks for indications of leakage. Repair or replacement of tanks which are shown to be leaking increases the cost a great deal further.

To aid the detection and prevention of leaks, double wall (dual containment) tanks have been used for both underground and above ground storage. The space between the two walls of the tanks is monitored for leakage. When used underground, monitors can be used to sense both water seepage in and stored liquid seepage out. If a leak is detected, the tank can be drained and abandoned, dug up and removed, or repaired in place. These options are all quite expensive. If the contaminated soil surrounding the leaking tank must be removed, the expense increases dramatically. However, conventional double wall tanks are quite expensive and are not presently able to meet fire code standards for above-ground storage of flammable liquids. Therefore, even when dual containment tanks are used, flammable liquid is most often stored in below-ground tanks.

Creating a concrete encased hollow tank is not without problems. One conventional method of doing so, described in U.S. patent application Ser. No. 936,205 mentioned above, is to form an open-top hollow shell, place the tank within the hollow shell and then pour the top. However, this process creates cold joints which are possible sources of leaks and weak points in the structure. Therefore, a homogenous concrete shell, which would eliminate cold joints, would be preferable. Entombing a hollow tank in fluid concrete is hindered, if not prevented, by the fact that the hollow tank has a tendency to bob up or float within the fluid concrete. Although the tank could be filled with water to give it neutral buoyancy, this solution causes other problems, including difficulties arising from trying to remove all the water from the tank after the concrete has set.

SUMMARY OF THE INVENTION

The present invention is directed to a transportable, earthquake-resistant storage vault suitable for storing flammable liquid above ground while providing dual containment and the ability to monitor leakage through the primary (inner) containment vessel.

The storage vault made according to the invention includes, in a preferred embodiment, a concrete encased steel inner tank for holding the liquid. A spacer layer, such as polystyrene, is positioned between the outside surface of the inner tank and the layer of concrete. The spacer layer is covered by a liquid impervious liner. The layer of concrete and liner act as the outer tank. The spacer layer both acts as a thermal insulator and yet permits any leaks from the inner tank to collect at a collection region between the inner and outer tanks as discussed below.

In one embodiment the storage vault is created by wrapping the combination inner tank and spacer layer with a large sheet of polyethylene. The edges of the liner are gathered at the top of the tank so that any leaks from the inner tank are contained by the liner. The spacer layer encased, polyethylene liner wrapped, inner tank is then entombed within a layer of concrete, preferably reinforced concrete.

The outer tank preferably includes bottom supports. The bottom supports lift the tank a few inches above the support surface on which the tank rests to provide a visual inspection region between the bottom of the outer tank and the support surface so the user can visually monitor for leaks from the vault.

The spacer layer may be chosen so that if the liquid stored within the inner tank contacts the spacer layer, the spacer layer dissolves or "melts" thus permitting the leaked liquid to gather within a liquid collection region between the inner tank and the liner. A leak detection tube is used between the inner tank and liner to permit monitoring of the liquid collection region between the tube. This arrangement provides for maximum thermal insulation without sacrificing the ability to monitor for leaks. The spacer layer, being a good thermal insulator, provides further protection for the contents of the inner tank during fires. The added insulation also helps moderate the temperature swings of the liquid within the inner tank which aids the control of atmosphere pollution, as well as reducing safety risks. Since no air space needs to be provided between the inner and outer tanks for leak detection, pouring the concrete around the combination of the inner tank, spacer layer and liner is much simpler.

The use of reinforced concrete as the outer tank provides several advantages. The concrete provides a protective physical barrier for the inner tank to protect the inner tank from physical damage, at a reasonable cost. The concrete outer tank also serves as an effective thermal barrier. By using an Underwriters Laboratories approved inner tank and the reinforced concrete outer tank, an above-ground storage vault suitable for use with flammable liquids is achieved.

The invention is transportable and can be used above ground to store flammable liquids. This allows the storage vault to be especially suited for temporary use at construction sites. The costs associated with burying tanks underground are also eliminated with the present invention.

If desired, multiple storage vaults can be used and connected in parallel or in series according to the use requirements. Also, two or more inner tanks can be placed within a single outer tank.

Preferably the storage vault has a flat bottom. Unlike many prior art storage containers, which are spherical or cylindrical and must be supported on a stand, the invention needs no separate support stand. The invention is extremely stable and thus is quite resistant to damage from earthquakes.

With the present invention a flammable liquid can be stored safely above ground. This removes the tank from local regulations and codes dealing with monitoring below-ground storage tanks. The present invention still permits the user to effectively monitor for leaks before any contamination to the surrounding earth occurs. The ability to monitor the region between the primary and secondary containment vessels and the provision of skids or supports on the bottom of the storage vault so that the region beneath the outer tank can be visually inspected, provides a double measure of protection against damage to the environment.

The invention permits a user to store flammable fuels above ground while meeting environmental and safety requirements at a cost much less than comparable buried storage tanks.

Other features and advantages of the invention will appear from the following description in which the preferred embodiments have been set forth in detail in conjunction with the accompanied drawings.

BRIEF DESCRIPTION OF THE DRAWINGS

FIG. 1 is a side cross-sectional view showing a vault made according to the present invention.

FIG. 2 is an exploded cross-sectional view taken along line 2—2 of FIG. 1.

FIG. 3 is a schematic illustration showing a method for making the vault of FIG. 1.

FIG. 4 shows the inner tank of FIGS. 1-3 within the form assembly of FIG. 3.

FIG. 5 illustrates the internal reinforcing members of the inner tank of FIG. 4 allowing the tank to be used as a pressure vessel.

DETAILED DESCRIPTION OF THE PREFERRED EMBODIMENTS

Referring now to FIGS. 1 and 2, a vault 2 is shown to include a steel inner tank 4 surrounded by a spacer layer 6 of polystyrene. Inner tank 4 and spacer layer 6 are entombed or encased within an outer tank 8. Outer tank 8 includes a concrete layer 10 strengthened by rebar 12, and a liquid impervious liner 14 preferably by a sheet of polyurethane film. Conventional fill and vent pipes 16 extend from inner tank 4. A leak detector tube 20 is positioned between inner tank 4 and liner 14 and terminates at a liquid collection region 22. Tube 20 permits leaks from inner tank 4 to be monitored as the leaking liquid collects within region 22.

Spacer layer 6 performs a dual function. Spacer layer 6 is a good thermal insulator so to insulate the contents of inner tank 4 from external heat sources such as forest fires. In addition, spacer layer 6 helps keep the contents of inner tank 4 at a more uniform temperature than would otherwise exist. This helps reduce vapor pressures within inner tank 4 making the storage of liquids safer and reducing the potential for vapor leaks to the atmosphere. In addition, spacer layer 6 is chosen so that it melts or liquifies when the liquid within inner tank 4 contacts the material of the spacer layer. Typically, inner tank 4 will hold a liquid hydrocarbon fuel, such as gasoline or diesel fuel. By choosing a spacer layer 6 made of polystyrene, if the liquid within tank 4 leaks through and contacts spacer layer 6, polystyrene spacer layer 6 melts or dissolves thus creating an open region between inner tank 4 and outer tank 8 permitting the leaked hydrocarbon to collect at liquid collection region 22. This permits the leak to be quickly noticed through leak detector tube 20 using conventional methods.

As a further aid to detection of leaks, outer tank 8 includes bottom supports 24 which raise the bottom 26 of vault 2 above the support surface 28 to create an inspection region 30 between bottom 26 and support surface 28.

Turning now also to FIG. 3, a simplified view of the method for making vault 2 is shown. First, an appropriate inner tank 4 is selected and has a number of polystyrene panels 32 secured to the outer surface 34 of inner tank 4, typically by an adhesive. A large sheet 36 of a liquid impervious material, such as polyethylene film, is wrapped around the spacer layer encased inner tank. The edges 38 of sheet 36 are gathered over the top 40 of inner tank 4 so to create a second liquid barrier.

A concrete form assembly 42 is used to entomb the inner tank 4, spacer layer 6, liner 14 combination. Form assembly 42 includes a base plate 44, having a pair of openings 46, used to form bottom supports 24, and two L-shaped wall forms 48, 50. Wall forms 48, 50 constitute a sidewall form 51. After assembly of base plate 44 and wall forms 48, 50, a rebar cage 52 is placed within an enclosure 54 defined by wall forms 48, 50 and base plate 44. A layer 56 of concrete is then poured within enclosure 54 to cover base plate 44. The combination 58 of inner tank 4, spacer layer 6 and sheet 36, which creates liner 14, is then positioned within enclosure 54 on top of the still wet layer 56 of concrete. Additional concrete is then placed within the region 60, see FIG. 4, between combination 58 and wall forms 48, 50 sufficient to cover combination 58 and be generally level with top edge 62 of sidewall form 51. The specific construction of form assembly 42 will now be discussed with reference to FIG. 4, in particular the structure for keeping combination 58 from bobbing up out of the fluid concrete.

Form assembly 42, in addition to wall forms 48, 50 and base plate 44, includes a pair of form clamp assemblies 64 at opposite corners 66, 68 of sidewall form 51, a lateral positioning assembly 70 adjacent base plate 44 and a pair of hold-down assemblies 72 which keep inner tank 4 from floating within the concrete while it is fluid.

Clamp assemblies 64 each include an L-bracket 73, welded to sidewall form 51, and a chain 74, secured at one end to L-bracket 73 by an adjustment bolt 76. Chain 74 has a hook 78 at the other end which engages the corner of the adjacent wall form 48 or 50. Chain 74 is tightened using a chain binder 80 which allows the user to easily apply a strong clamping load on the two wall forms 48, 50. Adjustment bolt 76 can be used to provide any necessary fine adjustment to the tension in chain 74. It has been found that use of two L-shaped wall forms 48, 50 and four form clamp assemblies 64 allow wall form 50 to be easily but securely fastened together while ensuring the proper, in this rectangular, shape is maintained.

Lateral positioning assemblies 70 each include a jack block 82 welded to base plate 44 at a position spaced apart from wall forms 48, 50. A hydraulic jack 84 is mounted between each jack block 82 and the opposing side of wall forms 48, 50. Applying sufficient force on wall forms 48, 50 through the use of jacks 84 positions sidewall form 51 on base plate 44 and keeps the lower ends of sidewall form 51 from moving laterally outwardly due to the pressure of the concrete while it is still fluid.

Each hold-down assembly 72 includes an elongate hold-down bar 86 having chamfered ends 88 guided between vertical guide plates 90. Guide plates 90 are mounted to wall forms 48, 50 and extend above top edge 62. Hold-down bar 86 has a pair of downwardly extending hold-down tubes 92 depending from its bottom surface 94 and a strong back 96 mounted centrally above the top surface 102 of hold-down bar 86. Strong back 96 has an arcuate guide surface 98 and a pair of vertical guide plates 100. Hold-down assembly 72 includes a chain 104 having each end 106 secured to an anchor point 108 on jack block 82. Chain 104 passes from the jack block 82 on one side of form assembly 42, between vertical guides 90, across chamfered ends 88, over curved surface 98 of strong back 96 and down past the chamfered ends of hold-down bar 86 on the other side. Hold-down assembly 72, also includes a chain ratchet 110. Chain ratchet 110 is used to shorten the effective of length of chain 104 thus forcing tubes 92 against the top 112 of inner tank 4.

Guide rings 114, each having an internal diameter slightly larger than the external diameter of tubes 92, are welded to top 112 at positions chosen to engage the lower ends of tubes 92. Once so engaged, lateral, as well as upward, movement of inner tank 4 within enclosure 54 is substantially eliminated.

Strong back 96 is used to strengthen hold-down assembly 72. Strong back 96 keeps hold-down bar 86 from bowing upwardly due to the upward force on the hold-down bar caused by tank 4 attempting to float when surrounded by fluid concrete.

Turning now to FIG. 5, an inner tank 4' is shown to include U-channel reinforcing members 130 welded to the inside surface 132 of inner tank 4' so that inner tank 4' may be used as a pressure vessel. Reinforcing members 130 form a number of hoops 134 circumscribing the interior of tank 4'. The ends 136 of inner tank 4' have vertically extending reinforcing members 130 mounted along their interior surfaces as well. Pairs of reinforcing members 130 are placed back to back at positions 138 along top 112 of inner tank 4' and at positions 140 along the bottom 142 of inner tank 4'. This provides extra strength along the central portion of tank 4'. A pair of lifting brackets 144 are welded to top 112 of tank 4' adjacent positions 138 to facilitate moving tank 4'.

A vault 2 made with an inner tank 4' can be used as a vacuum storage vessel to safely handle waste motor oil or crank case motor oil. The vault incorporating reinforced inner tank 4' could have a vacuum continuously applied to the inner interior of inner tank 4'. A hose (not shown) would then be used to connect inner tank 4' to the oil, or other liquid, to be disposed of. The waste oil so collected could then periodically be removed from the vault through the use of, for example, a mobile vacuum tank truck which can suck the waste oil directly out of the inner tank 4' and into the mobile tank. This would permit gasoline service stations, auto dealers, lube and oil change centers, among others, to safely and conveniently store the waste oil and grease in a safe, cost-effective manner. Even without creating a vacuum in the interior of a vault 2, vault 2 would still be useful for safely and inexpensively storing such waste oil waste grease and other flammable materials by pumping or pouring the waste material directly into the vault.

To use form assembly 42, base plate 44 is positioned on a, preferably, level support surface. Wall forms 48, 50 are positioned on base plate 44 and are fastened to one another by form clamp assemblies 64 at each corner 66, 68. Hydraulic jacks 84 are then operated to properly position sidewall form 51 on base plate 44 and keep the bottom of the sidewalls from kicking out due to the pressure of the fluid concrete. Rebar cage 52 is then placed within enclosure 54 and a layer 56 of concrete is poured into enclosure 54 to create bottom 26 of outer tank 8. Combination 58, see FIG. 3, is then lowered into enclosure 54 until it rests on layer 56 of concrete.

Hold-down bars 86 are then positioned over enclosure 54 and lower ends of tubes 92 are positioned within rings 114. Chains 104 are then placed over hold-down bar 86 and fastened to jack blocks 82 at anchor points 108. Chain ratchets 110 are used to tighten chains 104 sufficiently to place an appropriate force on hold-down bars 86. Concrete is then poured into enclosure 54 to entomb combination 58, with the exception of various fill and vent pipes 16 extending up through concrete outer tank 8. Note that layer 56 of concrete is still wet when the subsequent pour of concrete is made. This ensures a homogenous concrete layer 10 with no cold joints. Sidewall form 51 is then vibrated to settle the aggregate in the concrete. The top surface 120 of outer tank 8 is smoothed. Shear pins 122 can be used to keep hold-down bars 86 from moving upwardly past upper holes 124 in vertical guides 90.

Once the concrete has set sufficiently chain ratchets 110 are actuated to loosen chains 104, shear pins 122 are removed from holes 124 and hold-down bars 86 are lifted upwardly to remove tubes 92 from the layer of concrete covering top 112 of inner tank 4. The holes left by removal of tubes 92 are filled with fresh concrete. After the concrete has cured sufficiently, side-wall form 51 is removed from vault 2 and vault 2 is separated from base plate 44.

Modification and variation can be made to the disclosed embodiments without departing from the subject of the invention as defined by the following claims. If desired, non-flammable liquids can be stored in vault 2. Although it is preferred to include rebar cage 52 as a part of outer tank 8, one need not necessarily do so. Inner tank 4, although in the preferred embodiment made of steel, could be made of other suitable material according to the particular liquid being contained and the environment. It is preferred that vault 2 have a flat bottom for stability. However, other shapes are also possible. Vertical force can be applied to inner tank 4 during curing of the concrete in ways not shown. For example, tubes 92 could be replaced by I-beams permanently mounted to inner tank 4 and left within concrete top 126. Also, by appropriately positioning fill and vent pipes 16, the tops of these pipes may be used to apply the necessary vertical force on inner tank 4 to keep the inner tank from floating before the concrete has set. One or both of chain binders 80 and chain ratchets 110 may be replaced by other suitable tightening devices, such as hydraulic push-pull jacks.

I claim:

1. A method for making a storage vault for containing a liquid, comprising the following steps:
   providing an inner container to hold said liquid, said inner container having a top;
   providing an enclosure defined by wall forms and a base plate;
   covering at least a substantial portion of said inner container with a spacer material;
   wrapping said spacer material and inner container with a single sheet of liquid impervious material, said single sheet having edges;
   gathering said edges over said top of said inner container to create a liquid barrier;
   positioning the combination of said inner container, said spacer material and said sheet within said enclosure; and entombing said wrapped spacer material and inner container by placing concrete within a region between said walls forms and said combination of said inner container, said spacer material and said sheet, to produce homogenous layer of concrete which serves as an outer container.

2. A method for making a storage vault for containing a liquid hydrocarbon, comprising the following steps:
- providing an inner container to hold said hydrocarbon, said inner container having a top;
- providing an enclosure defined by wall forms and a base plate;
- covering at least a substantial portion of said inner container with a spacer material that liquefies upon contact with said hydrocarbon;
- wrapping said spacer material and inner container with a single sheet of polyurethane film material, said single sheet having edges;
- gathering said edges over said top of said inner container to create a liquid barrier;
- positioning the combination of said inner container, said spacer material and said sheet within said enclosure; and
- emtombing said wrapped spacer material and inner container by placing concrete within a region between said wall forms and said combination of said inner container, said spacer material and said sheet, to produce a homogenous layer of concrete which serves as an outer container.

3. A method for making an above-ground storage vault for containing a liquid hydrocarbon, comprising the following steps:
- providing an inner container to hold said hydrocarbon, said inner container having a top;
- providing an enclosure defined by wall forms and a base plate;
- covering at least a substantial portion of said inner container with a spacer material that liquefies upon contact with said hydrocarbon;
- wrapping said spacer material and inner container with a single sheet of polyurethane film material, said single sheet having edges;
- gathering said edges over said top of said inner container to create a liquid barrier;
- positioning the combination of said inner container, said spacer material and said sheet within said enclosure; and
- entombing said wrapped spacer material and inner container by placing concrete within a region between said wall forms and said combination of said inner container, said spacer material and said sheet, to produce a homogenous layer of concrete which serves as an outer container.

* * * * *